Aug. 17, 1965  R. T. SCHULTZ  3,201,650

SHORT PROTECTOR CIRCUIT

Filed March 9, 1959

Robert T. Schultz,
INVENTOR.

BY.

ATTORNEY.

United States Patent Office 3,201,650
Patented Aug. 17, 1965

3,201,650
SHORT PROTECTOR CIRCUIT
Robert T. Schultz, 1250 N. Tressy Ave., Glendora, Calif.
Filed Mar. 9, 1959, Ser. No. 798,176
12 Claims. (Cl. 317—23)

This invention relates to power supplies and more particularly to circuits for protecting direct current power supplies from abnormal current demands which may be placed thereon.

One of the greatest problems which exists with respect to direct current power supplies is the protection of the power supplies and their associated circuits from the damage which would result when a heavy current demand is placed upon them. Such a heavy current demand in the most common instance results when a short circuit occurs in the load which is connected to the output terminals of a power supply. In many instances in the prior art, it has been the practice to include within a power supply sensitive regulator circuits, error voltage sensing circuits, amplifiers and the like. If a short circuit or other malfunction in the load which is attached to the power supply creates an excessive current flow from the power supply to the load, components contained within the power supply and its associated circuits may be destroyed. This is particularly true if semiconductor devices such as transistors and diodes are utilized as a part of the associated circuits of the power supply.

A number of circuits have been developed which are utilized to protect a power supply from such a short circuit or malfunction occurring in the load which is attached thereto. In all cases presently known to the art, the circuit which has been developed to offer this protection has been a circuit which senses a no voltage condition in the output of the power supply in order to actuate the protecting circuit. As is well known in the art, a short circuit across the output terminals of a power supply does cause a no voltage condition in the power supply output. However, when the power supply is turned off and is in an inoperative condition, the output voltage thereof is also at zero. Since this is true the protector circuits which operate by sensing a lack of the output voltage also cause substantial problems in certain types of power supplies. Power supplies of the voltage converter type, wherein a low direct current voltage is inverted to a high direct current voltage become difficult to start when the initial voltage input is applied thereto if the prior art protector circuits are used. Such a low voltage to high voltage converter circuit is as described in Patent No. 2,837,651, issued June 3, 1958, to Robert T. Schultz and entitled "Power Oscillators."

In circuits of the type described in the above referred to patent, a resistor is often placed in the input circuit in order to accomplish starting when a prior art protector circuit is a part of the output of the power supply. When this occurs, the power supply including the protection circuit operates according to specifications at room temperature. However, the starting problem is still apparent at low temperatures and the power supply is not protected at higher temperatures.

In order to properly protect a circuit such as a power supply from an abnormal current demand resulting from a short circuit or like malfunction, it should first be recognized that such a malfunction consists essentially of a zero impedance network which is connected across the output voltage terminals of the power supply and in parallel with the impedance of the load. When this definition of a short circuit is recognized it becomes possible to design a circuit for protecting a power supply from abnormal current demands as a result of a short circuit or other malfunction in the load attached thereto which overcomes the disadvantages which have been inherent in the protector circuits heretofore utilized. That is, a protector circuit which becomes operative by sensing or detecting a substantially zero impedance condition at the output of the power supply.

Accordingly, it is an object of the present invention to provide a circuit for protecting direct current power supplies from abnormal current demands.

It is another object of the present invention to provide a circuit for protecting direct current power supplies from abnormal current demands which is operative only during the time a substantially zero impedance condition exists at the output terminals of the power supply.

It is another object of the present invention to provide a circuit for protecting direct current power suppiles utilizing transistors from abnormal current demands.

It is a further object of the present invention to provide a circuit for protecting power supplies from abnormal current demands when the power supplies take the form of direct current inverters using transistors therein which does not interfere with the starting of the inverters.

It is a further object of the present invention to provide a circuit for protecting direct current power supplies from abnormal current demands which is effective at all operating temperatures of the power supply.

A circuit for protecting direct current power supplies from abnormal current demands in accordance with the present invention includes a source of sensing voltage having a first means connected thereto for maintaining the sensing voltage inoperative during normal operation of the power supply and the load, but which permits the sensing voltage to become operative during an abnormal current demand. The sensing voltage and said first means is connected to the load. The load is connected to the output voltage terminals of the power supply. A second means is connected to the source of sensing voltage and to the load and is responsive to the sensing voltage only during the time that the sensing voltage is operative. The second means is operative to protect the power supply from the abnormal current demand.

The novel features of the present invention are set forth in the appended claims. Other and more specific objects will become apparent from a consideration of the following description taken in conjunction with the accompanying drawing which is presented by way of example only and is not intended as a limitation upon the scope of this invention and in which:

Figure 1:
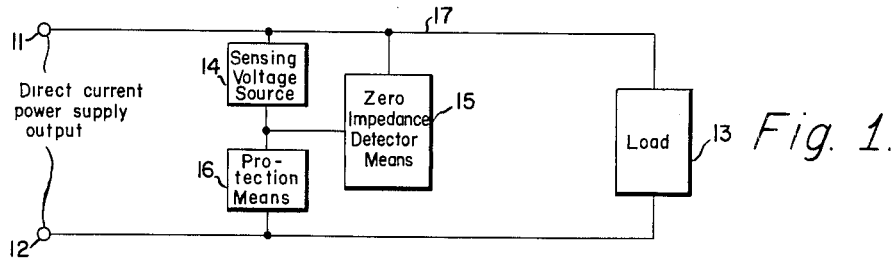
FIG. 1 is a schematic circuit diagram in block form representing a protector circuit in accordance with the present invention.

Referring now to the drawing, and more particularly to FIG. 1, a circuit in accordance with the present invention is illustrated. As is therein shown, terminals 11 and 12 are the output voltage terminals of a power supply not shown. Any direct current power supply may be used for purposes of illustrating the circuit of the present invention. A load 13 is connected to terminals 11 and 12 for utilizing the output voltage of the power supply. A source of sensing voltage 14 is provided in accordance with the concept of the present invention. A zero impedance detector means 15 is also provided. As is illustrated, both the source of sensing voltage 14 and the zero impedance detector means 15 are connected to the load 13. There is also provided a means for protecting the power supply 16 and as illustrated, protection means 16 is connected to the source of sensing voltage 14 and to the load 13. The source of sensing voltage 14 may be in the form of a battery, a voltage divider network, the output of a separate power supply or any other source of voltage well known to the prior art.

The zero impedance detector means 15 is operative in such a manner as to render the source of sensing voltage ineffective during normal operation of the power supply and the load 13. However, when a short circuit or other malfunction develops in load 13 thus presenting a substantially zero impedance condition and thereby a heavy current demand is placed upon the power supply, the zero impedance detector means 15 detects this zero impedance condition and abnormal current demand and by this detection renders the source of sensing voltage effective. The source of sensing voltage, in turn, after being rendered effective, causes the protection means to become operative in order to protect the power supply from the abnormal current demand. The protection rendered may be by removing the input voltage from the power supply, by shunting the abnormal current from the power supply, or the like. This protection state continues until such a time as the zero impedance condition and abnormal current demand disappear. Upon disappearance of the zero impedance condition and abnormal current demand the detector means 15 once more becomes operative to render the source of sensing voltage ineffective. This in turn thereby returns the protection means to its ineffective state.

As is illustrated in FIG. 1, the zero impedance detector means 15 is connected in parallel with the source of sensing voltage 14. It should, however, be understood that zero impedance detector means may, in the alternative, be connected in series with the source of sensing voltage 14. In such an instance, the detector means 15 would be connected between the source of sensing voltage 14 and lead 17 which is connected to terminal 11 of the power supply.

Figure 2:
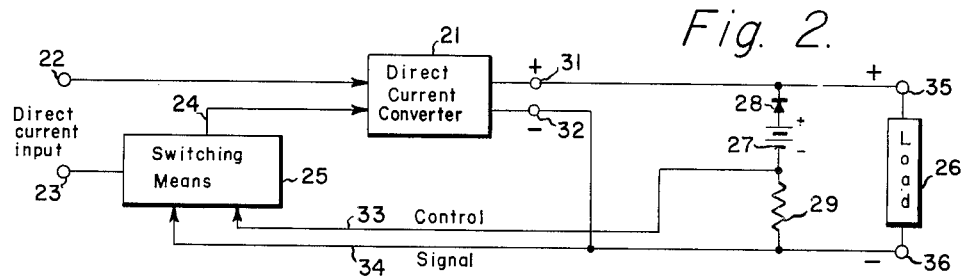
FIG. 2 is a schematic circuit diagram partly in block form illustrating a specific embodiment of the present invention.

Referring now more particularly to FIG. 2, one embodiment of a protector circuit in accordance with the present invention is illustrated more in detail. For purposes of example only, a direct current converter circuit of the type referred to in the hereinabove referenced patent may be used and is as illustrated at 21. This type of power supply is depicted since such converters are becoming more and more used in the art at the present time. The input voltage to the direct current converter 21 is applied to the terminals 22 and 23. This input voltage may be supplied by a battery or any other desired source of direct current voltage. As is illustrated, terminal 22 is connected directly to direct current inverter 21. Terminal 23 is, however, connected to an input terminal of a switching means 25. The switching means will be more fully described hereinafter in conjunction with FIG. 3. The output terminal of the switching means is connected by way of lead 24 to the direct current converter 21. Although the switching means 25 is shown as connected in the input end to the converter 21, it should be expressly understood that the switching means 25 may be used at any desired point in the circuit. For example, it may be connected to output terminal 31 or 32 of converter 21. The output of the direct current converter 21 appears at terminals 31 and 32 which are connected to a load 26. Also connected across the load and the output terminals of the converter 21 is one embodiment of a protector circuit in accordance with the present invention. A battery 27 having the polarity as illustrated is utilized as the source of sensing voltage. The zero impedance detector means is shown as a diode 28 which is connected between one terminal of the source of sensing voltage and terminal 31 of the direct current inverter 21. Connected to the other terminal of the source of sensing voltage 27 is the protector means which is illustrated as a resistor 29. The resistor 29 is connected to the output terminal 32 of the direct current converter and the other terminal 36 of the load 26. Resistor 29 is chosen to have much less impedance than that of the load 26 but a greater resistance than that of a malfunction which creates an abnormal current demand. With the protector circuit connected as illustrated in FIG. 2, the output terminals 31 and 32 of the direct current inverter 21 will have a polarity as illustrated, terminal 32 being negative and terminal 31 positive. A pair of leads 33 and 34 are connected from the resistor 29 back to the switching means 25 for applying a control signal thereto. The purpose of leads 33 and 34 and the signal which they carry will be more fully described hereinafter.

In the normal operating condition wherein no abnormal current demand is placed upon direct current converter 21 by load 26, diode 28 is maintained in its reversed bias condition by the positive potential which is applied to the cathode thereof from output terminal 31 of the direct current inverter 21. By diode 28 remaining reversed biased, an effective open circuit is connected to the positive terminal of battery 27. This, therefore, renders battery 27 ineffective as far as operation in the circuit is concerned.

By battery 27 being ineffective and as a result of the open circuit of the diode 28, due to its being reversed biased, no current flows through the resistor 29 and no signal appears across it. Therefore, no control signal is applied to the switching means by way of leads 33 and 34. When no control signal is applied to switching means 25 it will be in a closed condition and as a result thereof, the voltage from the input voltage source as applied to terminals 22 and 23 will be applied through the switching means 25 by lead 24 directly to the input terminals of direct current converter 21. Converter 21 will, therefore, function normally and apply an output voltage to the load 26.

If, however, a sudden abnormal current demand is placed upon direct current converter 21 such as by example, placing a zero impedance or short across terminals 35 and 36 in parallel with the load 26, the following operation will result: The zero impedance will cause the voltage appearing at terminals 35 and 36 to suddenly drop to substantially zero. By so doing, the voltage which has maintained diode 28 reversed biased is suddenly removed. The voltage of the battery 27 which is the source of sensing voltage then becomes operative. By becoming operative, the sensing voltage source applies a positive potential to the anode of diode 28 thereby forward biasing it. This permits current to flow from the positive terminal of battery 27 and through diode 28. The current will thereafter flow through the zero impedance connected across terminals 35 and 36, through resistor 29, and to the negative terminal of battery 27. Since resistor 29 is chosen so as to have a resistance which is greater than the impedance of the malfunction, and since the forward biased resistance of diode 28 is negligible, the entire voltage of battery 27 appears as a voltage drop across the resistor 29. This voltage is then applied by way of leads 33 and 34 to switching means 25 as a control signal. This control signal causes the switching means 25 to function and thereby open the path by which the voltage is applied to the input terminals of direct current converter 21. Since the input voltage is removed from converter 21, it ceases to function and the output voltage is removed from terminals 31 and 32 and as a result thereof, from the load 26. By removal of this voltage, the abnormal current demanded by the zero impedance is not supplied by the direct current converter 21 and it is, therefore, protected. The combination of diode 28, source of sensing voltage 27 and resistor 29 continues to operate to maintain switching means 25 in an open condition so long as the zero impedance condition exists.

If the zero impedance across the load is then removed the following series of events will occur: Since load 26 has a much greater impedance than does resistor 29, substantially all of the voltage supplied by the source of sensing voltage 27 will be dropped across load 26 and, therefore, very little if any will appear as a voltage drop across resistor 29. Since little or no voltage drop appears across resistor 29, no control signal is applied to the switching means 25 and it therefore assumes its original normally closed position and thereby applies the input voltage to the input terminals 22 and 23 of the direct current converter 21. This will, therefore, cause the direct current inverter to function and once more apply voltage to its output terminals 31 and 32 and thereby to the load 26. The switching means as illustrated at 25 in FIG. 2, may include any conventional means, which when subjected to an input signal, will be responsive thereto to open the circuit which is connected to its terminals. Such means would include both electronic and electrical type desvices.

Figure 3:
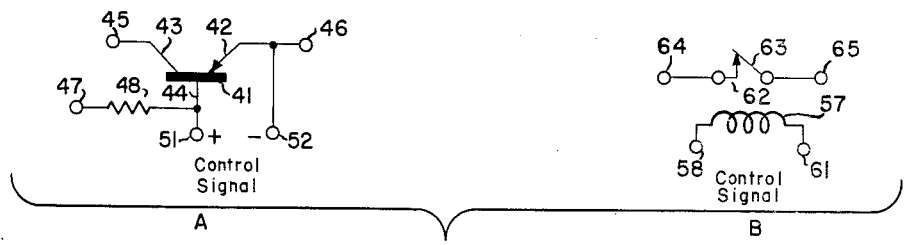
FIG. 3 is a series of schematic circuit diagrams representing a part of the circuit illustrated in FIG. 2.

Two embodiments of switching means which may be utilized, in the circuit of FIG. 2, are illustrated in FIG. 3 at A and B thereof by way of example only. As shown in FIG. 3A, the switching means 25 may include a transistor 41 having an emitter 42, a collector 43 and a base 44. Terminals 45 and 46 are connected to collector 43 and emitter 42 respectively. The input terminal 23 as illustrated in FIG. 2 of switching means 25 is connected to terminal 45 while the output terminal 24 is connected to terminal 46. A resistor 48 is connected between base 44 and a terminal 47. A biasing voltage is applied to terminal 47 for maintaining transistor 41 in a conducting state during normal operation of the inverter 21. The control signal as developed across resistor 29 as illustrated in FIG. 2 and above described is applied to terminals 51 and 52 connected to the base 44 and the emitter 46 respectively of the transistor 41. The control signal has the polarity as indicated at terminals 51 and 52. When the control signal is applied in such a polarity as illustrated in FIG. 3A, the transistor 41 would become non-conducting since the emitter base diode thereof would be back biased by the control signal. As long as a signal appears across resistor 29 having a magnitude greater than the signal applied across the emitter and base terminals 46 and 47 of the transistor 41, the transistor 41 would be maintained in a non-conducting state. As above described, at the point when the zero impedance is removed from across the load 26, and the signal developed across the resistor 29 is reduced to essentially zero, the transistor 41 would once more become conducting. The inverter 21 then functions in its normal manner.

The switching means 25 as illustrated in FIG. 2, may, in those circumstances where speed of operation is not critical, be a conventional relay as illustrated in FIG. 3B. Such a relay would include an actuating coil 57 having terminals 58 and 61 connected thereto. The relay would include a contact 62 having an armature 63 in operative relationship therewith. Terminals 64 and 65 would be connected to the contact 62 and the armature 63 respectively. A relay for utilization as a switching means 25 as illustrated in FIG. 3B would, in its normal or quiescent state, have the contacts thereof normally closed. Upon application of the control signal developed across resistor 29 to the terminals 58 and 61 of the coil 57, the armature 63 is actuated in such a manner as to open the contact between contact 62 and armature 63, thus disrupting the application of voltage to the direct current inverter 21. When the signal across resistor 29 is removed from the coil 57, the relay returns once more to its normally closed position, thus causing the inverter 21 to function in its normal manner.

Figure 4:
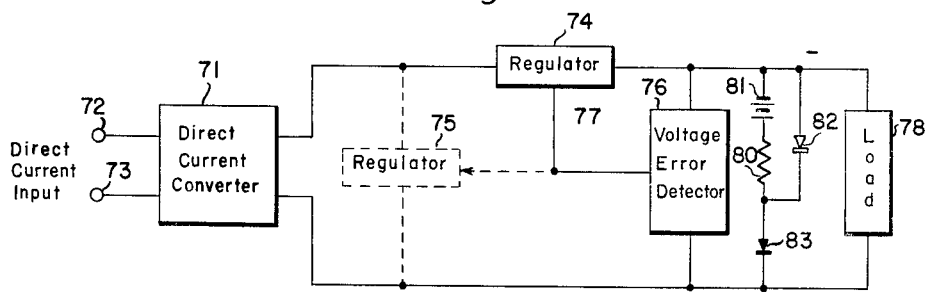
FIG. 4 is a schematic circuit diagram partly in block form illustrating a second embodiment of a circuit in accordance with the present invention.

Referring now more particularly to FIG. 4, an alternative embodiment of a circuit in accordance with the present invention is illustrated. A direct current converter 71 of the type above referred to is also illustrated, by way of example only, as the power supply in the presently preferred embodiment of the present invention. Terminals 72 and 73 are connected to the direct current converter 71 for application of the input voltage thereto. A regulator 74 is connected in one of the output leads from the direct current converter 71 and as illustrated, is a series type regulator. In the alternative, the regulator may be of a parallel type which is connected across the output leads of the direct current converter 71 and would, therefore, be as shown by dashed block 75. A voltage error detector 76 is also connected across the output of the direct current converter 71 and the signal developed thereby is applied by way of lead 77 to either regulator 74 or 75 for controlling the output voltage which is applied to the load as illustrated at 78. The voltage error detector and the regulator may be of any type which is well known to the art at the present time. For example, such a voltage error detector may be a differential amplifier which compares the output voltage developed by the inverter to a reference voltage and amplifies any discrepancy between them which may be detected. The amplified error signal is then applied to the regulator to accomplish regulation in the usual fashion. Connected to one output lead from the converter 71 and to the load 78 is a source of sensing voltage which may be a battery 81 as illustrated in FIG. 4. Also connected to the load 78 and to one output lead of the converter 71 is a diode 82 which is the zero impedance detector. Connected in series with the combination of the battery 81 and the diode 82 is a second diode 83 which functions as the protector means and which is also connected to the other output terminal of the converter 71 and to the load 78. A current limiting resistor 80 is connected between the source of sensing voltage and the common point between diodes 82 and 83. This combination of the battery 81 and the series connected diodes 82 and 83 functions to protect the converter 71 and its associated circuits from any abnormal current demand which may result from a zero impedance appearing across the load 78. Polarity of the output voltage from the converter 71 is as illustrated in FIG. 4. This polarity of the output voltage from converter 71 causes diodes 82 and 83 to be reverse biased. Diode 82 as shown in FIG. 4, is a Zener diode having the well known Zener breakdown characteristic. With the output of the converter 71 being of the polarity as illustrated in FIG. 4, the Zener diode 82 would be back biased and would be in its characteristic Zener breakdown operation, thus having a constant voltage drop thereacross. The constant voltage drop and the polarity of the output from the converter 71 is such as to maintain diode 83 in a reversed biased condition, thereby rendering it ineffective. The drop across the Zener diode 82 would be of such a value as to render the battery 81 ineffective, so long as the Zener diode 82 remained in its reversed biased breakdown condition.

If a zero impedance were to then be placed across the load 78, the voltage appearing across the output of the converter 71 is caused to suddenly drop in magnitude. This, in turn, causes the Zener diode 82 to drop out of its characteristic Zener breakdown thereby rendering battery 81 effective. This being the case, the battery 81 applies a positive potential to the anode of the diode 83 causing it to become forward biased. Current, limited by resistor 80, flows from the positive terminal of the battery 81, through the diode 83, the zero impedance across the load, and back to the negative terminal of the battery 81. The abnormal current which is demanded by the zero impedance across the load is, therefore, supplied by the battery 81 and the diode 83. This, therefore, protects the power supply and its associated circuits from damage as a result of the abnormal current demand. Although the source of sensing potential is, as illustrated in FIG. 4, a battery 81, it should be expresssly understood that this source of potential may be from a separate power supply, a voltage divider, or other type network which can supply the current demanded by a short or other malfunction which may occur in the load 78.

Upon removal of the short or other malfunction in the load, the output voltage from converter 71 returns to its normal value. This causes Zener diode 82 to once more break down and thereby render battery 31 ineffective and diode 83 back biased. The converter 71, therefore, returns to its normal operating condition.

The starting operation of a power supply using the protector circuit of the present invention will now be considered. In the off condition of a power supply, its output voltage is zero. Referring first to FIG. 2, it is seen that diode 28 is forward biased by battery 27 and current flows through the load 26 and the resistor 29. However, since the resistance of resistor 29 is much less than the impedance of load 26, little or no voltage drop appears across resistor 29 and the switching means 25 remains in its normally closed position. Therefore, the inverter 21 would encounter no difficulty in starting. Raising or lowering the ambient temperature would in no way affect the operation of the circuit.

Referring now to FIG. 4, when the power supply is in the off condition. The diode 83 is forward biased and current flows through the load 78. This is no way affects the starting of the inverter 71. If the flow of current through the load 78 when the power supply is off is undesirable, this may be remedied by supplying the source of sensing voltage by connecting a separate power supply into input terminals 72 and 73. In this manner, the protector circuit would be de-energized during the time the power supply is off.

There has thus been disclosed a circuit for protecting a power supply from abnormal current demands which senses the presence of a very low impedance as opposed to a zero voltage condition. The circuit as disclosed operates to protect the power supply from the abnormal current demand, but where a direct current to direct current inverter is utilized as the power supply, will not effect the starting thereof.

What is claimed is:

1. In a direct current power supply having a load connected to first and second terminals thereof, a circuit for protecting said power supply from excess current flow therethrough as a result of an abnormal current demand from said load, said protecting circuit comprising: a zero impedance detecting means connected to said first terminal of said power supply; a source of sensing voltage having a substantially constant magnitude which is less than the magnitude of the voltage supplied by said power supply during normal operating conditions; means connecting said source of sensing voltage to said detecting means, said detecting means being operative in response to normal operation of said power supply to maintain said source of sensing voltage electrically ineffective, said detecting means being operative in response to an abnormal current demand on said power supply to render said source of sensing voltage electrically effective; protection means connected to said second terminal of said power supply; and means connecting said protection means to said source of sensing voltage, said protection means being operative only in response to the electrical effectiveness of said sensing voltage source to remove said abnormal current demand from said power supply thereby to protect said power supply from said abnormal current demand, said protection means further being operative to automatically restore said power supply and load to normal operation in response to said source of sensing potential becoming electrically ineffective.

2. In a direct current power supply having a load connected to first and second terminals thereof, a circuit for protecting said power supply from excess current flow therethrough as a result of an abnormal current demand from said load, said protecting circuit comprising: a source of sensing voltage having a substantially constant magnitude which is less than the magnitude of the voltage supplied by said power supply during normal operating conditions; first means connected to said sensing voltage source and to said first terminal of said power supply for automatically maintaining said sensing voltage electrically ineffective during normal operation of said power supply and said load and electrically effective only during abnormal current demand upon said power supply from said load; and second means connected to said sensing voltage source and to said second terminal of said power supply, said second means being responsive to said sensing voltage only when said sensing voltage source is electrically ineffective to protect said power supply from said abnormal current demand, said second means further being operative to automatically restore said power supply and load to normal operation in response to said source of sensing potential becoming electrically ineffective.

3. In a direct current power supply having a load connected to first and second terminals thereof, a circuit for protecting said power supply from excess current flow therethrough as a result of an abnormal current demand from said load, said protecting circuit comprising: a source of sensing voltage having a substantially constant magnitude which is less than the magnitude of the voltage supplied by said power supply during normal operating conditions; first means connected to said sensing voltage and to said first terminal of said power supply, said first means being responsive to normal operation of said power supply for automatically maintaining said sensing voltage source electrically inoperative, said first means being further responsive to an abnormal current demand upon said power supply from said load to automatically render said sensing voltage electrically operative; a resistive impedance element connected to said second terminal of said power supply; means connecting said impedance element to said sensing voltage source, said resistive impedance element being responsive to said sensing voltage when said sensing voltage source is electrically operative to thereby provide a signal; and switch means connected to said impedance element and said power supply and responsive to said signal to protect said power supply from said abnormal current demand by removing the output thereof from said load, said switch means being further responsive to automatically restore the output of said power supply to said load upon the removal of said signal from said resistive impedance element.

4. In a direct current power supply having a load connected to first and second terminals thereof, a circuit for protecting said power supply from excess current flow therethrough as a result of an abnormal current demand from said load, said protecting circuit comprising: a source of sensing voltage having first and second terminals and having a substantially constant magnitude which is less than the magnitude of the voltage supplied by said power supply during normal operating conditions; a resistive impedance element having an impedance which is less than that of said load connected to said first terminal of said source of sensing voltage; and a unidirectional current flow device connected to said second terminal of said source of sensing voltage and poled to be forward biased by said sensing voltage, the series connected source of sensing voltage, impedance element, and unidirectional current flow device being connected across said first and second terminals of said power supply, said power supply terminals having such a polarity as to reverse bias said unidirectional current flow device during normal operation of said power supply.

5. In a direct current power supply having a load connected to output terminals thereof, a circuit for protecting said power supply from excess current flow therethrough as a result of an abnormal current demand from said load, said protecting circuit comprising: a source of sensing voltage having first and second terminals and having a substantially constant magnitude which is less than the magnitude of the voltage supplied by said power supply during normal operating conditions; a diode connected to said first terminal and poled to be forward biased by said source of sensing voltage; a resistor having a resistance which is less than the impedance of said load connected to said second terminal; and means connecting said source of sensing voltage, said diode, and said resistor across said output terminals of said power supply, the polarity of said output terminals of said power supply being such as to reverse bias said diode during normal operation of said power supply.

6. A circuit for use in combination with a direct current power supply having a load connected across output terminals thereof to protect said power supply from excess current flow therethrough as a result of an abnormal current demand from said load, said circuit comprising: a zero impedance detecting means, means for connecting said detecting means to one output terminal of said power supply, a source of sensing voltage having a substanitally constant magnitude which is less than the magnitude of the voltage supplied by said power supply during normal operating conditions, means interconnecting said source of sensing voltage and said detecting means, protection means, means for connecting said protection means to another output terminal of said power supply, and means interconnecting said protection means and source of sensing voltage, said detecting means being responsive to normal operation of said power supply to render said source of sensing voltage electrically ineffective, said detecting means being further responsive to a substantially zero impedance condition in said load to render said source of sensing voltage electrically effective only during the continuance thereof, said protection means being responsive to said source of sensing voltage only during the time it is electrically effective to remove the abnormal current demand from said power supply.

7. In a direct current power supply having a load connected to first and second terminals thereof, a circuit for protecting said power supply from excess current flow therethrough as a result of an abnormal demand from said load, said protecting circuit comprising: a source of sensing voltage having a substantially constant magnitude which is less than the magnitude of the voltage supplied by said power supply during normal operating conditions; first means connected to said sensing voltage source and to said first terminal of said power supply, said first means being responsive to normal operation of said power supply for maintaining said sensing voltage source electrically inoperative, said first means being further responsive to an abnormal current demand upon said power supply from said load to render said sensing voltage source electrically operative; a resistive impedance element connected to said second terminal of said power supply; means connecting said impedance element to said sensing voltage source, said resistive impedance element being responsive to said sensing voltage only when said sensing voltage source is electrically operative to thereby provide a signal; a transistor having an emitter, a collector, and a base; and means connecting said signal across said emitter and base of said transistor, said transistor being responsive to said signal to remove current from said load only during the time said load places an abnormal current demand upon said power supply.

8. In a direct current power supply having a load connected to output terminals thereof, a circuit for protecting said power supply from excess current flow therethrough as a result of an abnormal current demand from said load, said protecting circuit comprising: a sensing voltage source the magnitude of the voltage of which is substantially constant and less than the magnitude of the output voltage from said power supply during normal operating conditions; unidirectional current flow means connected between said sensing voltage source and one terminal of said power supply, said means being effectively open circuited by said power supply voltage during normal operation; control signal developing means connected between said source of sensing voltage and the other terminal of said power supply for developing a control signal only in response to the magnitude of said power supply voltage dropping below the magnitude of said sensing source voltage; and protection means connected to said control signal developing means and being responsive to a signal developed thereby to remove the output of said power supply from said load.

9. A protecting circuit according to claim 8 in which said protection means is a normally conducting electronic circuit which is rendered non-conducting by said control signal.

10. A protecting circuit according to claim 9 in which said protection means is a transistor.

11. A protecting circuit according to claim 8 in which said protection means is a relay.

12. In a direct current power supply having a load connected to output terminals thereof, a circuit for protecting said power supply from excess current flow therethrough as a result of an abnormal current demand from said load, said protecting circuit comprising: a sensing voltage source having first and second terminals, the value of the voltage thereof being substantially constant and less than the value of the voltage from said power supply during normal operating conditions; a unidirectional current flow device connected between said first terminal of said sensing voltage source and one terminal of said power supply and being poled to be forward biased by said sensing voltage and reverse biased by said power supply voltage; a resistive impedance element having an impedance less than the impedance of said load connected between said second terminal of said sensing voltage source and the other terminal of said power supply; and electronic switch means connected between said impedance element and said power supply for removing the output of said power supply from said load in response to a signal developed across said impedance element by said unidirectional current flow device becoming forward biased and for re-applying the output from said power supply to said load upon said unidirectional current flow device becoming reverse biased.

References Cited by the Examiner

UNITED STATES PATENTS

| 2,473,344 | 6/49 | McCown | 317—51 X |
| 2,571,027 | 10/51 | Garner | 317—16 |
| 2,791,739 | 5/57 | Light | 321—2 |
| 2,815,446 | 12/57 | Coombs | 317—51 |
| 2,832,900 | 4/58 | Ford | 317—33 |
| 2,833,977 | 5/58 | Levy | 321—2 |
| 2,888,633 | 5/59 | Carter | 317—51 X |

SAMUEL BERNSTEIN, *Primary Examiner.*